United States Patent
Bahel et al.

[11] Patent Number: 5,630,325
[45] Date of Patent: May 20, 1997

[54] HEAT PUMP MOTOR OPTIMIZATION AND SENSOR FAULT DETECTION

[75] Inventors: Vijay Bahel, Sidney; Hank Millet, Piqua; Mickey Hickey, Sidney; Hung Pham, Dayton; Gregory P. Herroon; Wayne R. Warner, both of Piqua; Jean-Luc M. Caillat, Dayton, all of Ohio

[73] Assignee: Copeland Corporation, Sidney, Ohio

[21] Appl. No.: 456,960

[22] Filed: Jun. 1, 1995

Related U.S. Application Data

[62] Division of Ser. No. 186,010, Jan. 24, 1995, Pat. No. 5,440,895.
[51] Int. Cl.[6] .................................................. F25B 41/04
[52] U.S. Cl. .................................................. 62/222
[58] Field of Search ........................ 62/222, 223, 210, 62/211, 204, 230

[56] References Cited

U.S. PATENT DOCUMENTS

| | | | |
|---|---|---|---|
| 4,034,570 | 7/1977 | Anderson et al. | 62/158 |
| 4,286,438 | 9/1981 | Clarke | 62/216 |
| 4,301,660 | 11/1981 | Mueller et al. | 62/126 |
| 4,495,779 | 1/1985 | Tanaka et al. | 62/211 |
| 4,620,424 | 11/1986 | Tanaka et al. | 62/222 |
| 4,878,355 | 11/1989 | Beckey et al. | 62/222 X |
| 5,157,934 | 10/1992 | Uchida | 62/212 |
| 5,241,833 | 9/1993 | Ohkoshi | 62/222 X |
| 5,303,561 | 4/1994 | Bahel et al. | 62/186 |
| 5,303,562 | 4/1994 | Bahel et al. | 62/222 |
| 5,311,748 | 5/1994 | Bahel et al. | 62/160 |
| 5,319,943 | 6/1994 | Bahel et al. | 62/156 |

*Primary Examiner*—Harry B. Tanner
*Attorney, Agent, or Firm*—Harness, Dickey & Pierce, P.L.C.

[57] ABSTRACT

The microprocessor-based HVAC control system detects sensor faults by comparing thermistor readings with predetermined extreme values, indicative of sensor fault. The system automatically selects the appropriate combination of automatic/preset modes of operating key system components such as the expansion valve, the demand defrost system and the indoor fan speed control system. With a view towards minimizing any negative impact on system performance and reliability in the event of sensor malfunction.

15 Claims, 12 Drawing Sheets

HEAT PUMP MOTOR OPTIMIZATION AND SENSOR FAULT DETECTION

This is a division of United States patent application Ser. No. 08/186,010, filed Jan. 24, 1995, entitled HEAT PUMP MOTOR OPTIMIZATION AND SENSOR FAULT DETECTION, now U.S. Pat. No. 5,440,895.

BACKGROUND AND SUMMARY OF THE INVENTION

The present invention relates generally to heat pump equipment for heating and cooling applications. More particularly, the invention relates to an electronic control system for optimizing compressor motor performance and for handling sensor faults while maintaining a minimum negative impact on system performance and reliability.

Conventionally air-conditioning and heat pump systems must be designed to handle extreme conditions which only infrequently occur. There is, for example, the maximum load/low voltage condition which occurs only on very hot days. On very hot days, the compressor discharge pressure is high and the suction pressure on the load side (indoors) is also high. High compressor motor torque is therefore required to meet these extreme pressure demands, which in turn dictates that the system be designed with an oversized compressor motor. Exacerbating this condition is the frequent low voltage or brownout condition that occurs in many parts of the country during hot days. The low voltage or brownout condition places an additional strain on the motor.

As a result of these maximum load/low voltage demands, system manufacturers have traditionally designed their systems with larger motors than would otherwise be required, if the extreme conditions could be guaranteed never to occur. The need to use these larger motors increases the cost of the system. Moreover, the use of larger motors actually decreases the overall system efficiency, since a motor designed to handle the high torque, low voltage extremes typically does not operate at peak efficiency under the less extreme conditions normally encountered. In effect, the need to accommodate the maximum load and low voltage conditions constrains the system designer to use a less efficient motor.

With the continuing effort to improve system efficiency, under extreme conditions and normal conditions alike, there is a need for ways to optimize motor efficiency. Conventional heating and cooling systems have been generally deficient in this regard.

Another area where heating and cooling systems could be improved is in the detection and handling of sensor faults. Today's HVAC equipment is becoming comparatively complex. Most systems use one or more sensors or transducers in conjunction with a control system which is intended to keep the system operating efficiently while meeting the heating and cooling demands of the load. Sensor malfunctions are therefore a significant problem.

In a conventional heat pump system, for example, a sensor may be used to implement the defrost function of the outdoor coil in heating mode. If this sensor malfunctions, the heat pump system can begin to improperly perform the defrost function. This can lead to blockage of the outdoor coil from frost buildup resulting in significant loss in heating performance. Such a conventional system does not have the capability to take corrective action or to alert the user that a sensor malfunction has occurred. Thus, a sensor malfunction may not become apparent until there is visual inspection of the outdoor unit of the heat pump system, or until the user notices higher electric bills from the lost heating performance, which must be made up by electric resistance heaters.

The present invention addresses this and other sensor fault problems by providing a microprocessor-controlled system operating mechanism which monitors the integrity of system sensors and keeps the heat pump system operational in alternate modes each designed to have a minimum negative impact on system performance and reliability. The system operating mechanism automatically selects the mode of operation, based on which sensor or sensors have been found to be malfunctioning. In addition, the system operating mechanism also provides an early warning to the user by displaying a sensor malfunction code or codes on the room thermostat. In addition to alerting the home owner that an error has occurred, the malfunction code is a time saving diagnostic tool for the technician during servicing of the system.

Accordingly, in one aspect the invention provides a system operating method in which the discharge temperature of the refrigerant discharged from the compressor is obtained and compared with a predetermined temperature indicative of an alert condition. Based on the comparing step, if the discharge temperature is above the predetermined temperature, the discharge temperature is used to control the setting of the heat pump system expansion valve. On the other hand, if the discharge temperature is not above the predetermined temperature (0° F.), the electronic expansion valve (EXV) is set to a predetermined setting.

According to another aspect of the invention, a sensor is used to obtain an outdoor air temperature and this outdoor air temperature is compared with a predetermined temperature indicative of a sensor fault condition. Based on the comparing step, if the outdoor air temperature is above the predetermined temperature, the outdoor air temperature is used to control the speed of the indoor fan or blower. On the other hand, if the outdoor air temperature is not above the predetermined temperature (−77° F.), the fan is run at a predetermined speed and the EXV set to a predetermined opening.

In yet another aspect of the invention, a sensor is used to obtain an outdoor coil temperature and this temperature is compared with a predetermined temperature indicative of an alert condition. Based on the comparing step, if the outdoor coil temperature is above the predetermined temperature, the outdoor coil temperature is used to control operation of the coil defrosting system. On the other hand, if the outdoor coil temperature is not above the predetermined temperature (−77° F.), the defrosting system is periodically operated at predetermined time intervals.

The aforementioned sensor fault handling methods may be implemented separately or in various combinations depending upon the complexity of the heat pump system. As more fully set forth below, the sensor fault handling methods can be applied in both heating mode and cooling mode.

In yet another aspect of the invention, a system operating mechanism is provided which checks for the existence of conditions indicative of a maximum load/low voltage condition and which automatically opens the expansion valve to increase refrigerant flow. This has the beneficial effect of cooling the system. By thus providing automatic system cooling it is possible to implement an HVAC system more economically since the heat pump motor can be sized and optimized for normal conditions instead of abnormal conditions.

For a more complete understanding of the invention, its objects and advantages, reference may be had to the following specification and to the accompanying drawings.

BRIEF DESCRIPTION OF THE DRAWINGS

FIGS. 4–7 are flowcharts depicting the sensor fault handling mechanism and method applicable when the heat pump system is in heating mode;

DESCRIPTION OF THE PREFERRED EMBODIMENT

The present invention provides an apparatus and method of handling sensor faults. The presently preferred embodiment employs a microprocessor-based control system with a complement of sensors and an electronically controlled expansion valve to optimally control the flow of refrigerant through the system. To illustrate the principles of the invention, a heat pump system, capable of providing both heating and cooling, will be described. A heat pump system of this type might be suitable for heating and cooling a commercial or residential building, although the principles of the invention are not limited to commercial and residential heating and cooling applications, but are applicable to virtually all pumped heat transfer systems.

Before giving a detailed description of the presently preferred embodiment, a brief review of the refrigeration cycle may be helpful. That cycle will be described in connection with a basic heat pump system illustrated schematically in FIG. 1.

Figure 1:
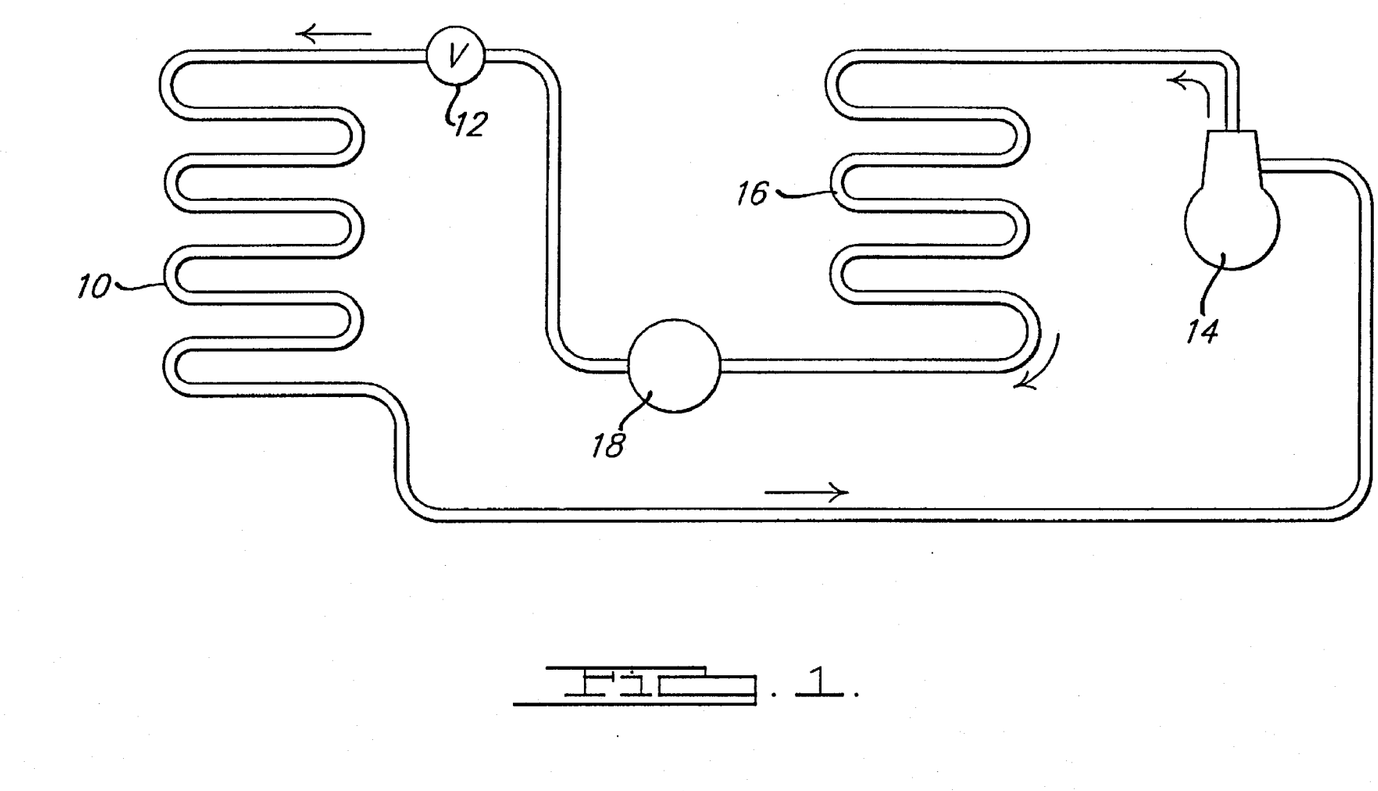
FIG. 1 is a simplified block diagram illustrating the basic components of an air-conditioning/heat pump system.

The heat pump cycle uses the cooling effect of evaporation to lower the temperature of the surroundings near one heat exchanger (the evaporator) and it uses the heating effect of high pressure, high temperature gas to raise the temperature of the surroundings near another heat exchanger (the condenser). This is accomplished by releasing a refrigerant under pressure (usually in the liquid phase) into a low pressure region to cause the refrigerant to expand into a low temperature mixture of gas and liquid. Commonly, this low pressure region comprises an evaporator coil, such as evaporator coil 10. The refrigerant mixture, once in the, evaporator coil 10, is exposed to the high temperature ambient air of the region to be cooled. Evaporation of refrigerant from liquid to gas absorbs heat from the ambient air and thereby cools it.

Release of refrigerant into the low pressure evaporator coil is usually metered by a restricted orifice or valve, commonly called an expansion valve 12. There are a wide variety of different types of expansion devices in use today, ranging from simple nonadjustable capillary tubes, to electrically adjustable valves such as pulse width modulated valves. The refrigerant at the outlet of the evaporator coil is compressed back into a high pressure state by compressor 14 and condensed into a liquid phase by condenser 16 so that it may be used once again. If desired, a sump 18 may be included, as illustrated. In a heat pump application, where the system is operating in the heating mode, the condensing of high pressure gas into a liquid phase supplies heat to the surroundings.

Having reviewed the basic principles of the refrigeration or heat pump cycle, a presently preferred embodiment of the invention will be described. Although the invention can take many forms, it will be described in conjunction with FIG. 2 where a heat pump system is depicted generally at 20. The system includes an indoor unit 22, a room unit or thermostat unit 23 and an outdoor unit 24. The indoor unit includes an indoor coil or heat exchanger 26 and an indoor fan 28. The indoor fan may be driven by a variable speed motor 30. The indoor fan and indoor coil are situated using suitable duct work, so that the fan forces ambient indoor across the indoor coil at a rate determined by the speed of the fan motor.

Figure 2:
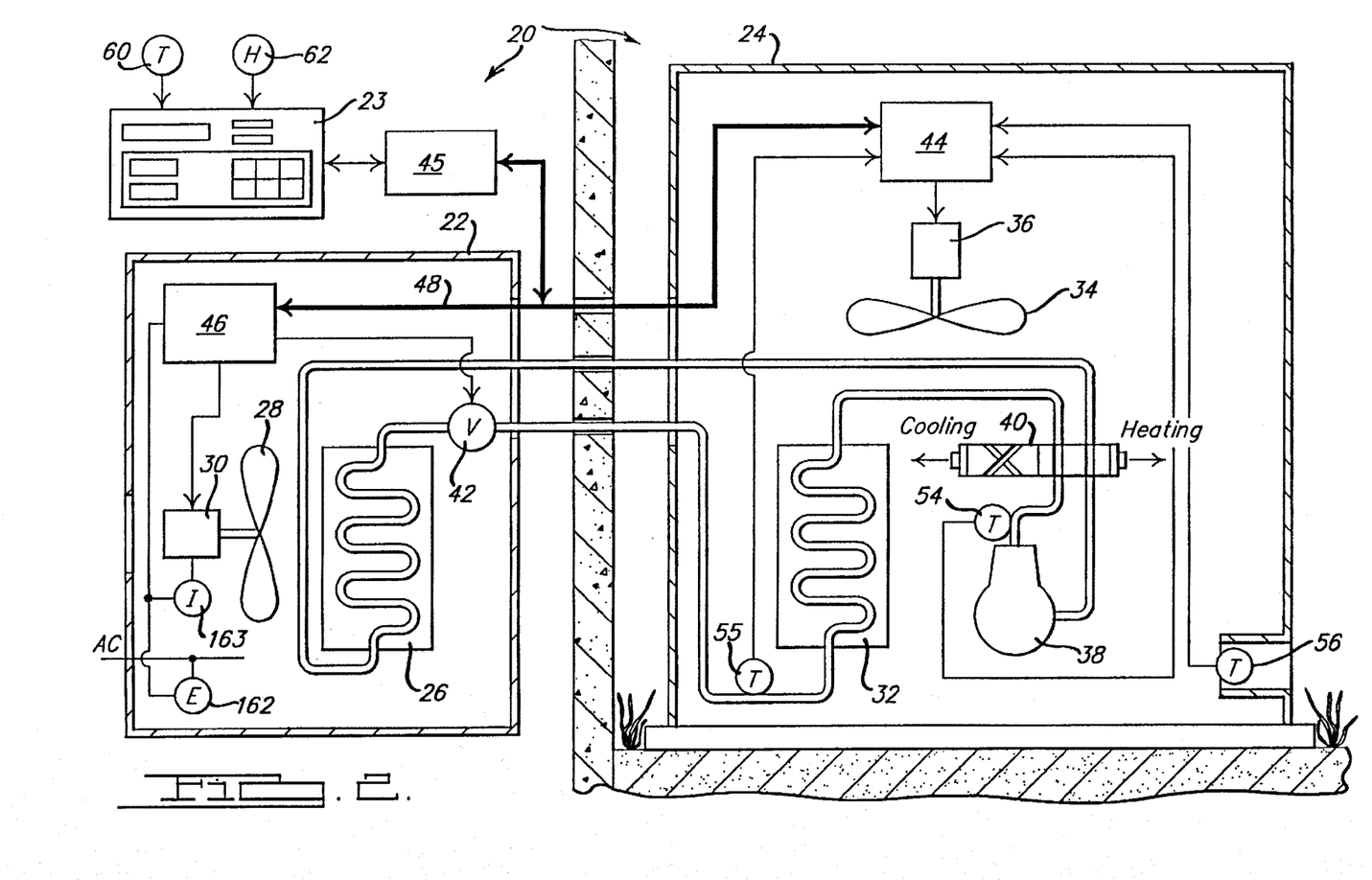
FIG. 2 is a more detailed view of the presently preferred air-conditioning/heat pump system into which the sensor fault handling mechanism of the invention may be integrated.

The outdoor unit includes an outdoor coil or heat exchanger 32 and an outdoor fan 34 driven by suitable motor 36. Preferably, the outdoor unit includes a protective housing which encases the outdoor coil and outdoor fan, so that the outdoor fan will draw ambient outdoor air across the outdoor coil to improve heat transfer. The outdoor unit may also typically house a compressor 38.

The system illustrated in FIG. 2 is a so-called "heat pump" system because it can be used for both cooling and heating, by simply reversing the function of the indoor coil and the outdoor coil. In the cooling mode, the outdoor coil functions as the condenser, while in the heating mode, the outdoor coil functions as the evaporator. Switching between the cooling mode and the heating mode is done using a four-way reversing valve 40. Referring to FIG. 2, when the four-way valve is switched to the cooling position (shown), the indoor coil functions as the condenser and the outdoor coil functions as the evaporator. When the four-way valve is set to the heating position (the alternate position), the functions of the coils are reversed.

The presently preferred embodiment uses an electronically controllable expansion valve (EXV) 42. In the presently preferred embodiment the expansion valve is a continuously variable (or incrementally variable) stepper motor valve which can be adjusted electronically to a wide range or orifice sizes or valve openings, ranging from fully open to fully closed. Although it is possible to implement the control system of the invention with other types of electrically controlled valves, pulse width modulated valves being an example, the stepper motor valve is presently preferred because it provides ripple-free operation and because it is more trouble-free. The stepper motor valve only needs to move or "cycle" when an orifice size adjustment is made. This may happen several times during a typical operating sequence (e.g., several times per hour). In contrast, the pulse width modulated valve cycles continuously at high frequency during the entire operating sequence.

The presently preferred system is a microprocessor-based system which gathers data from various sensors and which, among other things, determines the proper setting of the expansion valve based on the data gathered. This same microprocessor-based system is also used to perform the airflow obstruction and blocked fan detection processes of the invention, as will be more fully described below. More specifically, the presently preferred embodiment uses three interconnected microprocessor-based control units 44, 45 and 46, associated with the outdoor unit 24, indoor unit 22 and room unit or thermostat unit 23, respectively. Preferably all three microprocessor-based control units are linked together via a suitable communication link 48, such as a parallel or serial communication link. The outdoor control unit 44, is, in part, responsible for data collection, while the indoor control unit 46 is responsible for: on/off cycling of the system, modulating the indoor fan speed, control of the expansion valve, start/termination of demand defrost cycle, system diagnostics and performing the blocked fan and airflow obstruction detection processes of the invention.

The microprocessor-based system employs a plurality of sensors for measuring temperature at various locations throughout the system. Specifically, the present invention has a first temperature sensor 54, which measures the discharge temperature of the refrigerant as it exits the compressor 38. A second temperature sensor 55 measures the temperature of the outdoor heat exchanger 32 and a third temperature sensor 56 measures the temperature of the ambient air that is drawn into heat exchange contact with the outdoor heat exchanger by action of fan 34. Preferably temperature sensor 56 is situated in an inset region of the outdoor unit housing, so that it will be shaded from direct sunlight and yet will be situated in the airflow path of the air which makes heat exchange contact with the outdoor heat exchanger 32. In addition to these sensors, the system may also employ a fourth temperature sensor 60 which may be integrated into the room unit or thermostat unit 23. If desired, a humidity sensor 62 may also be incorporated in the room unit 23 and a voltage sensor 162 and current sensor 163 can be connected at any suitable points to sense the AC line voltage and current.

As the system operates it is expected that a certain amount of frost will begin to build up on the heat exchanger which is functioning as the evaporator. In a heat pump application, in heating mode, the outdoor coil functions as the evaporator. Thus, in heating mode the evaporator coil will gradually build up an accumulation of frost. This buildup of frost degrades system performance by obstructing optimal heat transfer. The present embodiment employs a demand defrost system which is designed to periodically melt this accumulated frost. Essentially, when a frost buildup is detected (as discussed below), four-way reversing valve 40 is cycled to its opposite position, temporarily reversing the functions of the indoor and outdoor coils. This causes heat to be pumped to the frosted outdoor coil, melting the frost.

The presently preferred embodiment uses thermistor sensors as temperature sensors. Thermistors are preferred because they are hermetically sealed, solid-state device, with a low probability of mechanical-type failure. In addition, thermistors provide long term stability and good temperature measurement accuracy over a wide temperature range. Although thermistors are presently preferred, other types of sensors may also be used to implement the invention.

Figure 3A:
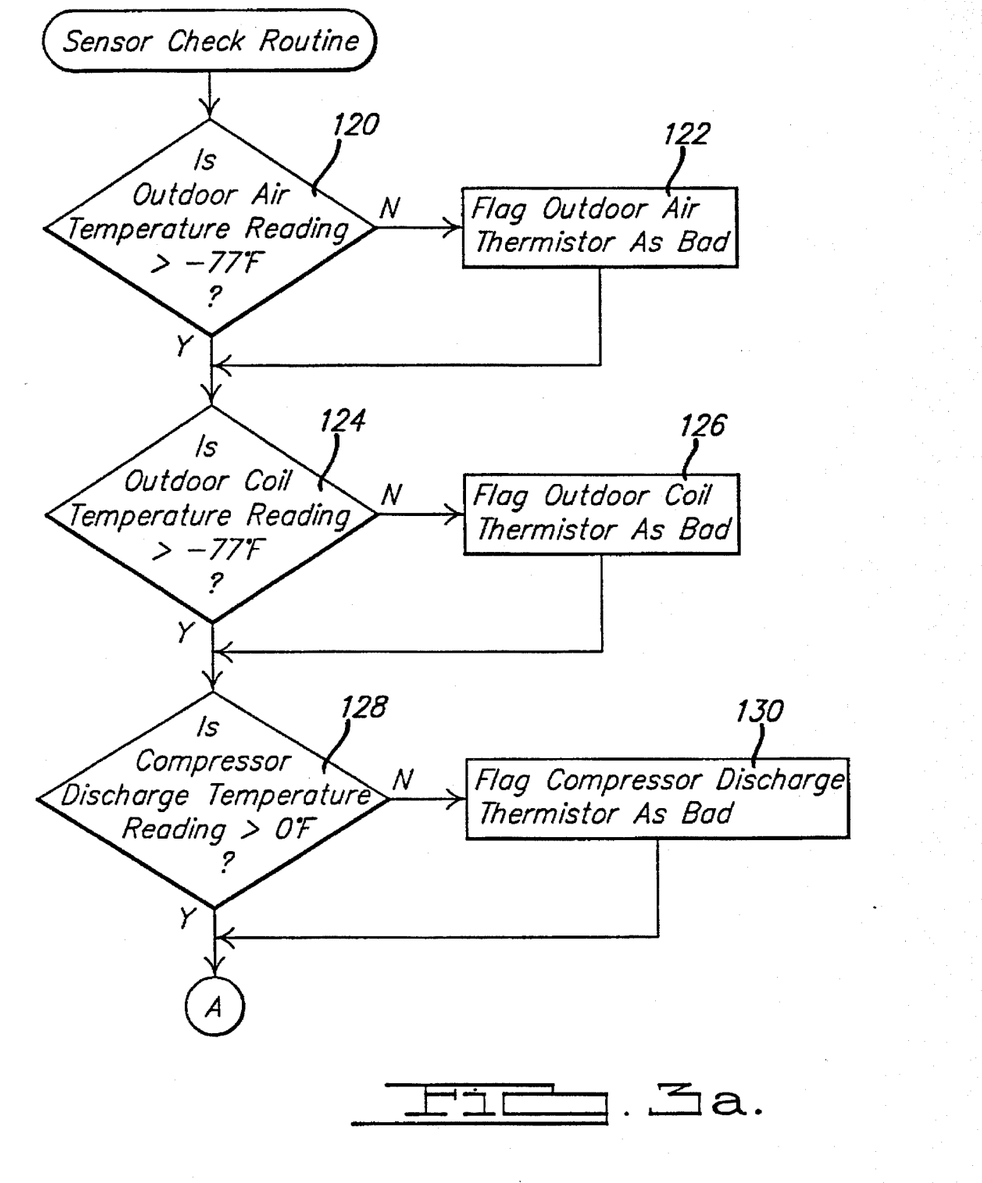
FIGS. 3a and 3b comprise a flowchart depicting the presently preferred sensor check routine, FIGS. 3a and 3b being joined at the point depicted at "A"
Figure 3B:
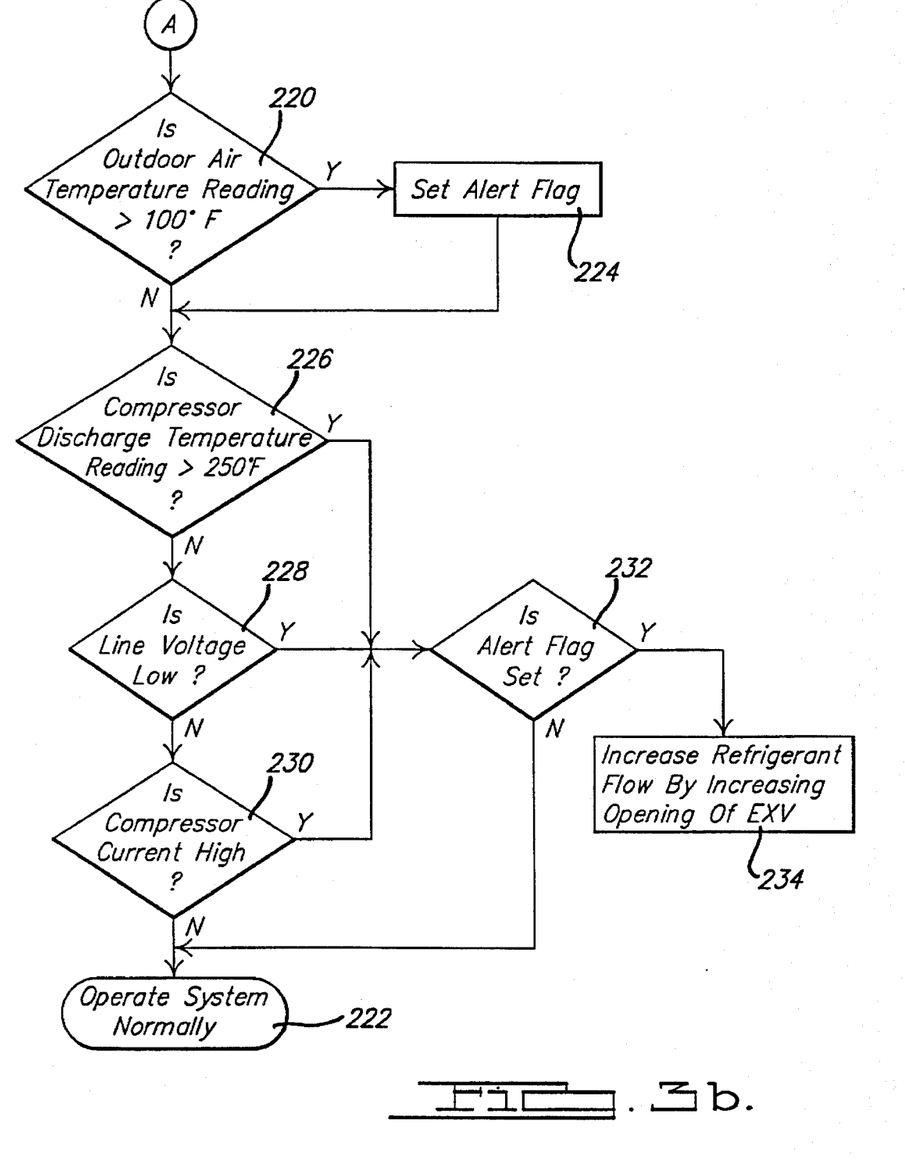

The presently preferred sensor fault detection routine or sensor check routine is depicted in FIG. 3. The sensor check routine begins at step 120, by comparing the outdoor air temperature with a predetermined low temperature, preferably −77° F. If the outdoor air temperature is not greater than this value, a software flag is set indicating the outdoor air thermistor is bad. This is illustrated at step 122. Next, at step 124 the outdoor coil temperature is compared with a predetermined value, again −77° F. If the outdoor coil temperature is not greater than this predetermined low value, then a flag is set indicating the outdoor coil thermistor as bad. This is illustrated at step 126. Next, at step 128, the temperature reading from the compressor discharge temperature sensor is compared with a predetermined value, in this case 0° F. If the compressor discharge temperature reading is not greater than this predetermined value, then a software flag is set indicating the compressor discharge thermistor as bad. This is shown at step 130. These software flags are used by the sensor fault handling mechanism and method of the invention. While the sensor check routine of FIG. 3 is presently preferred for its simplicity and reliability, other sensor integrity checks may alternatively be employed. For example, if desired, the impedance of each sensor can be tested in order to identify any short circuited or open circuited sensors.

After the sensor check routine has set any applicable flags, control proceeds to step 220 where a series of tests are performed to determined whether a maximum load condition exists. First, at step 220 the system tests to see if the outdoor air temperature reading is above 100° F. If not, the system is operated normally as indicated at 222. If the outdoor air temperature reading is greater than 100° F. (or some other comparatively high temperature indicative of a maximum load condition), control proceeds to step 224 where an alert flag is set. After the alert flag is set, one or more of a series of additional tests may be performed. In FIG. 3b the system tests the compressor discharge temperature at step 226 to determine if the discharge temperature is greater than 250° F. If the result of this test is TRUE, then control proceeds to step 232 where the alert flag is tested. If the alert flag is set (i.e., from step 224), then the setting of the expansion valve EXV is opened or increased to allow an increased flow of refrigerant through the compressor. If the alert flag was not set as determined at step 232, control simply proceeds to step 222 where the system operates normally.

The flowchart of FIG. 3b illustrates two additional tests at steps 228 and 230 which may be optionally included, separately or together, as additional tests or as a substitution for the test performed at step 226. In step 228 a test is performed to see if the incoming line voltage is low. A low line voltage condition would be indicative, for example, of a brownout condition. If the line voltage is low, control proceeds to step 232 where the alert flag is tested as described above. Step 230 tests to determine whether the compressor current is high. If the current is high this can be indicative of a maximum load or brownout condition and control similarly proceeds to step 232 where the alert flag is tested. It should be understood that the flowchart of FIG. 3b illustrates several redundant tests useful in determining when the maximum load condition exists. In an actual commercial embodiment it may not be necessary to include all of these tests. For example, suitable results could be obtained using only tests 220 and 226, or tests 220 and 228, or tests 220 and 230, for example. Also, while the use of an alert flag has been illustrated, this is but one way of implementing the logic performed by the system of the invention. Other equivalent flowcharts can be constructed to accomplish the same results.

By increasing the refrigerant flow in response to sensing the existence of or onset of a maximum load or low voltage condition causes the system to automatically begin cooling the motor. In this way, a smaller motor can be used without worry of overheating, and the smaller motor can therefore be properly optimized to provide maximum efficiency during normal operating conditions (non-maximum load). Thus, in effect, the electronics of the present invention automatically cool the motor during the maximum load and low voltage conditions, so that lower cost or efficient motors can be used.

The presently preferred sensor fault handling technique is summarized in Table I and Table II. Table I depicts the expansion valve control method, the defrost control method and the indoor fan speed control method for a heat pump system operating in heating mode. The microprocessor-based control system described above reads the state of the thermistor flags as set by the sensor check routine of FIG. 3 and selects the appropriate operating mode based on whether the sensors have been flagged as faulty or not. More specifically, the microprocessor-based system selects the operating mode of the expansion valve control, the operating mode of the defrost mechanism and the operating mode of the indoor fan speed setting based on these sensor flags. Table II illustrates the manner in which the microprocessor-based system selects the operating mode of the expansion valve control and of the indoor fan speed setting when the system is in the cooling mode. For convenience, Tables I and II both include a column captioned "Reference" to direct the reader to the figure which illustrates that particular operating mode.

Referring to FIGS. 4–7, when the heat pump system is in heating mode (as illustrated in each of FIGS. 4–7) the illustrated routines are performed. It is noted that when all sensors are operating properly, the expansion valve control is operated automatically in a closed-loop feedback system based on the compressor discharge temperature using outdoor air temperature as a reference. While the use of compressor discharge temperature and outdoor air temperature is presently preferred in the automatic control of the expansion valve, other sensor locations and arrangements are also possible. Further, with all sensors operating properly, the defrost method employs a demand defrost scheme whereby the outdoor coil is defrosted on an as-needed basis, based on outdoor coil temperature. Finally, with all sensors operating properly the indoor fan speed is preferably modulated based on outdoor air temperature. Ideally, the fan speed is set to the appropriate level in order to optimize efficiency.

Figure 4:
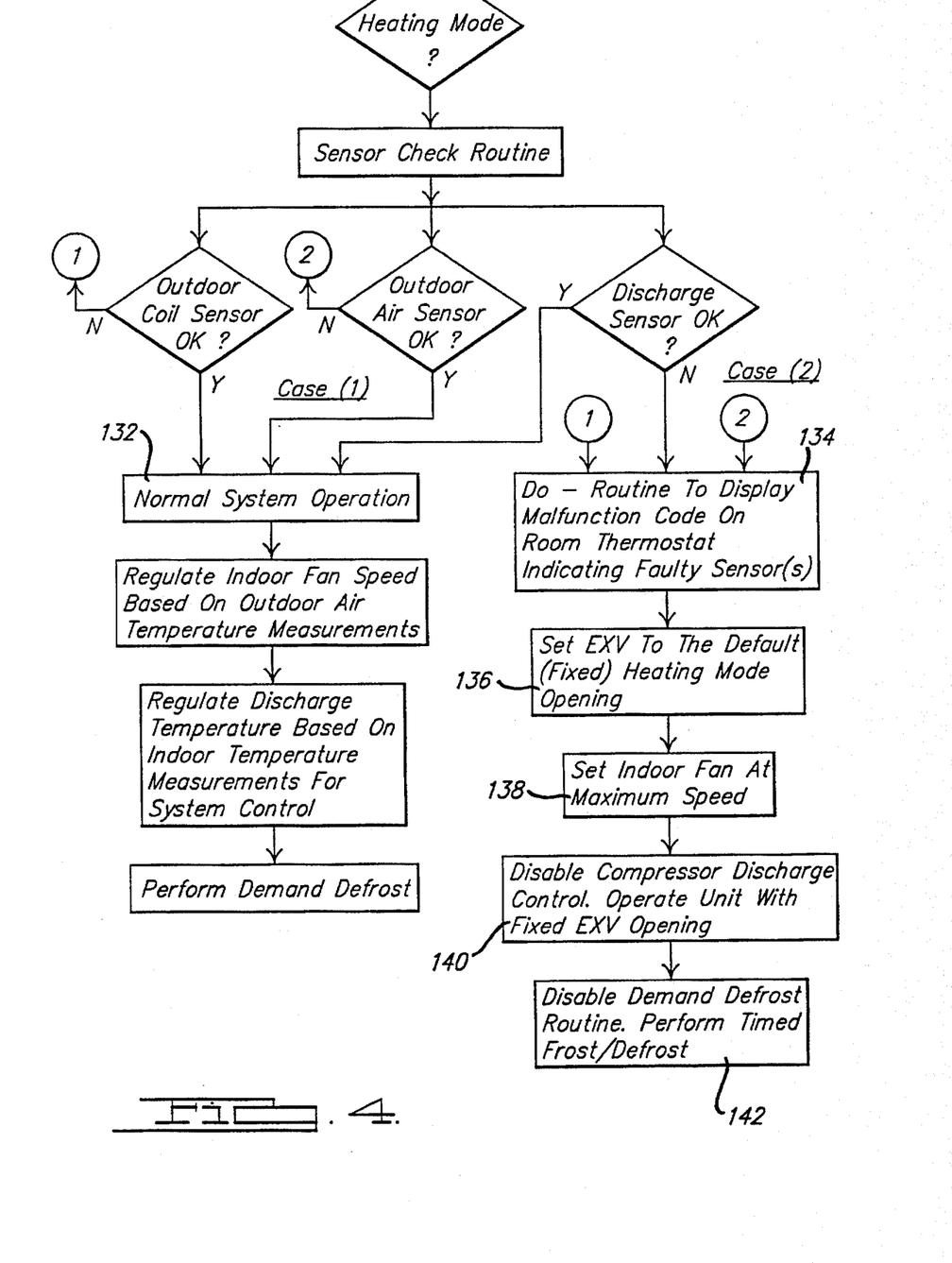

FIG. 4 illustrates the condition in which all sensors are properly operating in heating mode. This corresponds to the branch beginning at step 132 entitled "Normal System Operation." The case in which all three sensors have been flagged as bad is also depicted in FIG. 4 beginning with step 134 at which the malfunction code is displayed on the room thermostat. With all three sensors flagged as faulty, the expansion valve is set to a fixed position (step 136), the indoor fan speed is set to its maximum speed (step 138) and the demand defrost routine is disabled (step 142). In addition, the compressor discharge control is disabled so that the unit will continue to operate with the expansion valve set to the fixed default setting. This is illustrated at step 140.

The remaining FIGS. 5–11 show other combinations of faulty sensors and properly operating sensors. FIGS. 4–7 pertain to the Heating Mode; whereas FIGS. 8–11 pertain to the Cooling Mode.

Figure 8:
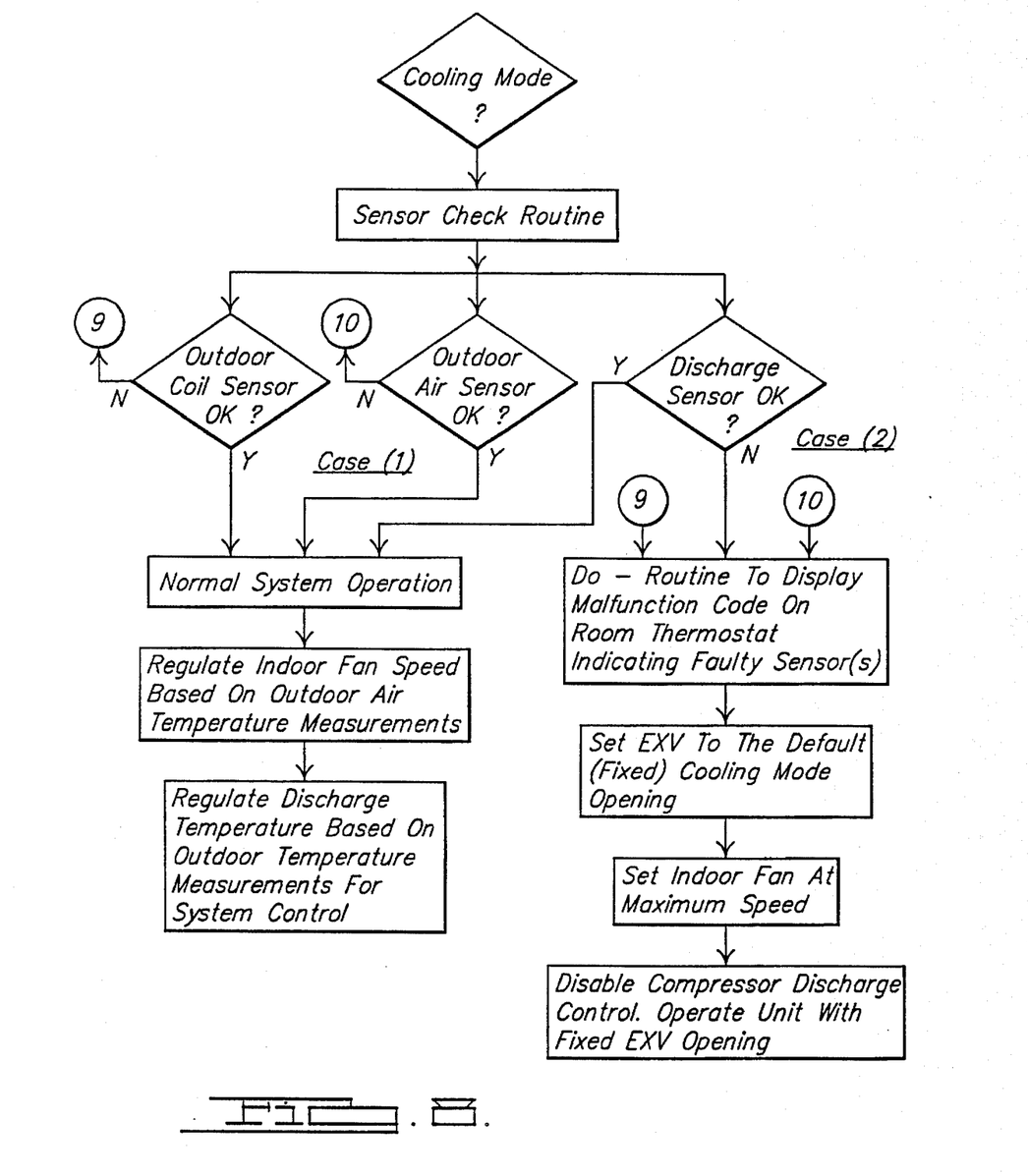
FIGS. 8–11 are flowchart diagrams depicting the sensor fault handling mechanism and method applicable when the heat pump system is in cooling mode.

By way of comparison, FIG. 8 illustrates the case in which all three sensors are operating properly in the cooling mode. FIG. 8 also depicts the case in which all three sensors have been flagged as failed in the cooling mode. The remaining figures show the microprocessor-selected modes of operating the expansion valve, the demand defrost and the indoor fan speed for each of the remaining sensor OK/NOT OK permutations. It is noted that in the cooling mode, the presently preferred embodiment does not implement demand defrost control. Of course, this feature could be added, if desired, by simply extending the logic illustrated for the heating mode in Table I.

TABLE I

Figure 5:
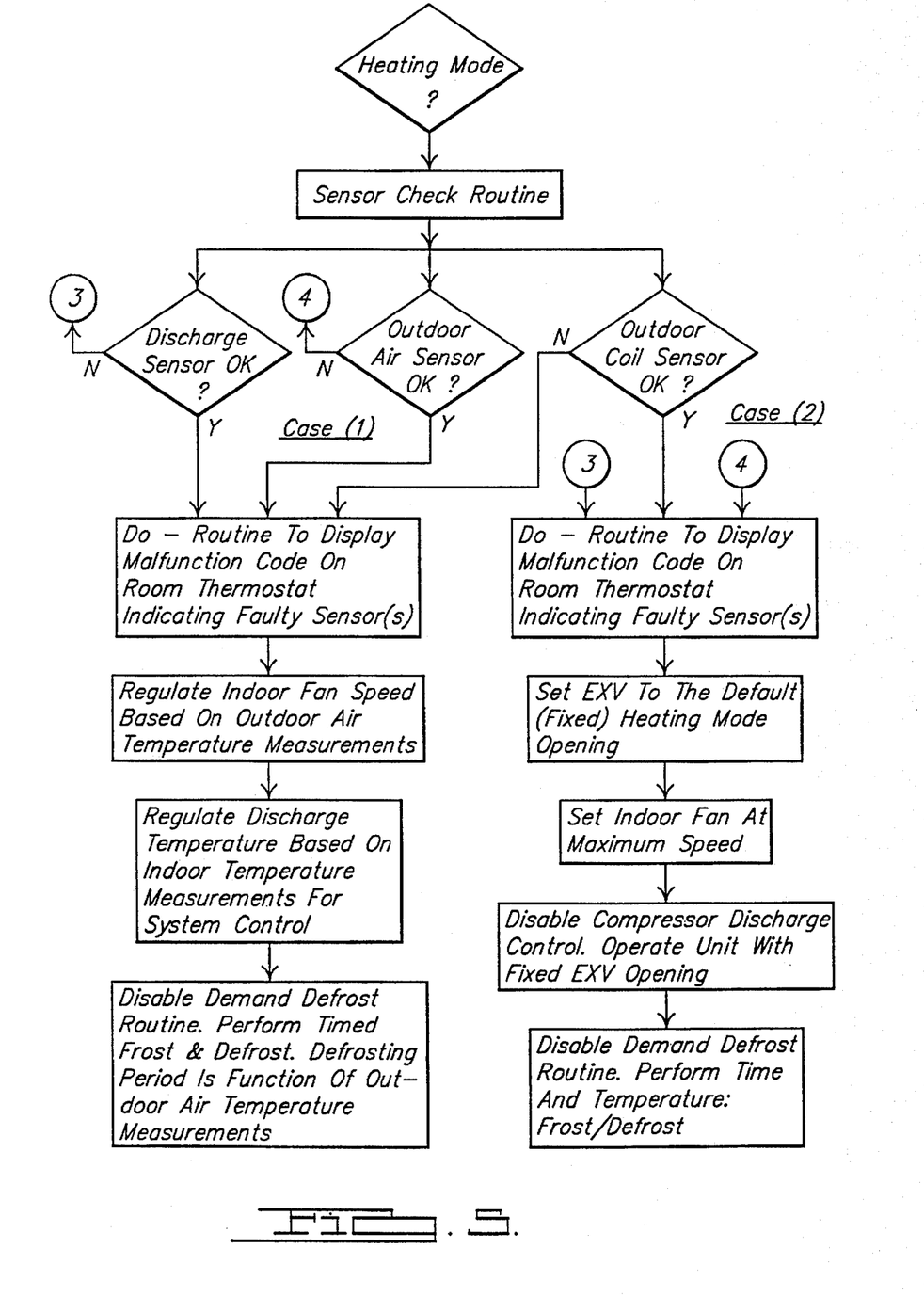
Figure 7:
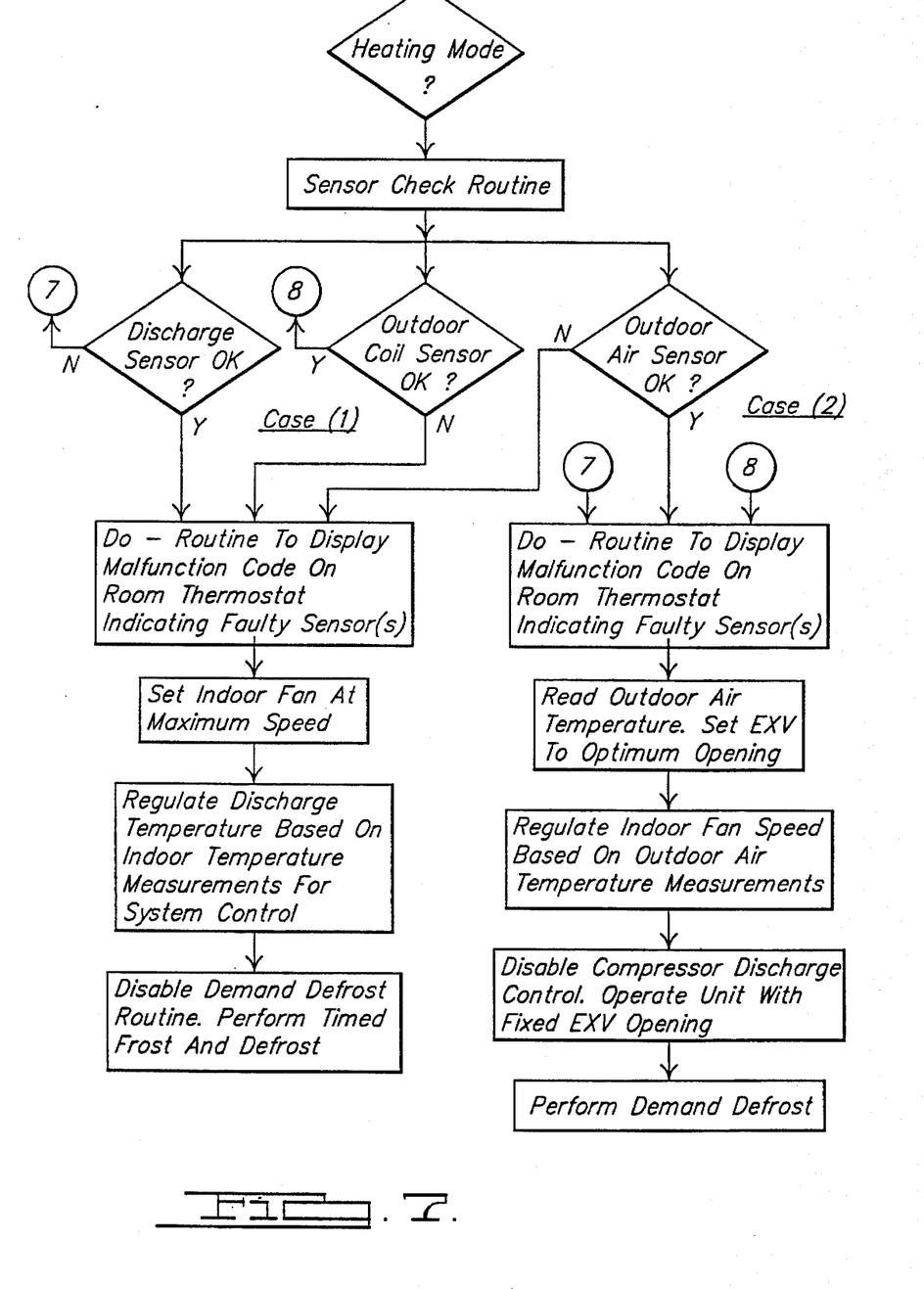

| | FIG. 4 | FIG. 5 | FIG. 6 | FIG. 7 |
|---|---|---|---|---|
| Operation Mode | Heat | Heat | Heat | Heat |
| Discharge Sensor | Not OK[2] OK[1] | Not OK[2] OK[1] | OK[1] Not OK[2] | Not OK[2] OK[1] |
| Outdoor Coil Sensor | Not OK[2] OK[1] | OK[2] Not OK[1] | OK[1] Not OK[2] | OK[2] Not OK[1] |
| Outdoor Air Sensor | Not OK[2] OK[1] | Not OK[2] OK[1] | Not OK[1] OK[2] | OK[2] Not OK[1] |
| EXV Control Method | Default-Fixed EXV Opening[2] Auto-Discharge Temp. Control[1] | Default-Fixed EXV Opening[2] Auto-Discharge Temp. Control[1] | Auto-Discharge Temp. Control[1] Fixed EXV Opening-Function of Outdoor Air Temp.[2] | Fixed EXV Opening-Function of Outdoor Air Temp.[2] Auto Discharge Temp. Control[1] |
| Defrost Method | 90 Min.-Frost Timed Termination[2] Demand[1] Defrost | 90 Min.-Frost Temp Termination[1] 90 Min.-Frost-Timed Termination[2] | 90 Min.-Frost Temp Termination[1] 90 Min.-Frost-Timed Termination[2] | Demand Defrost[2] 90 Min.-Frost-Timed Termination[1] |
| Indoor Fan Speed Setting | Maximum[2] Based on Outdoor Temp.[1] | Maximum[2] Based on Outdoor Temp.[1] | Maximum[1] Based on Outdoor Temp.[2] | Based on Outdoor Temp.[1] Maximum[2] |

[1] & [2] See FIGS. 4 through 7 for Explanation.
*Defrosting Period is a Function of Outdoor Air Temperature.

TABLE II

Figure 9:
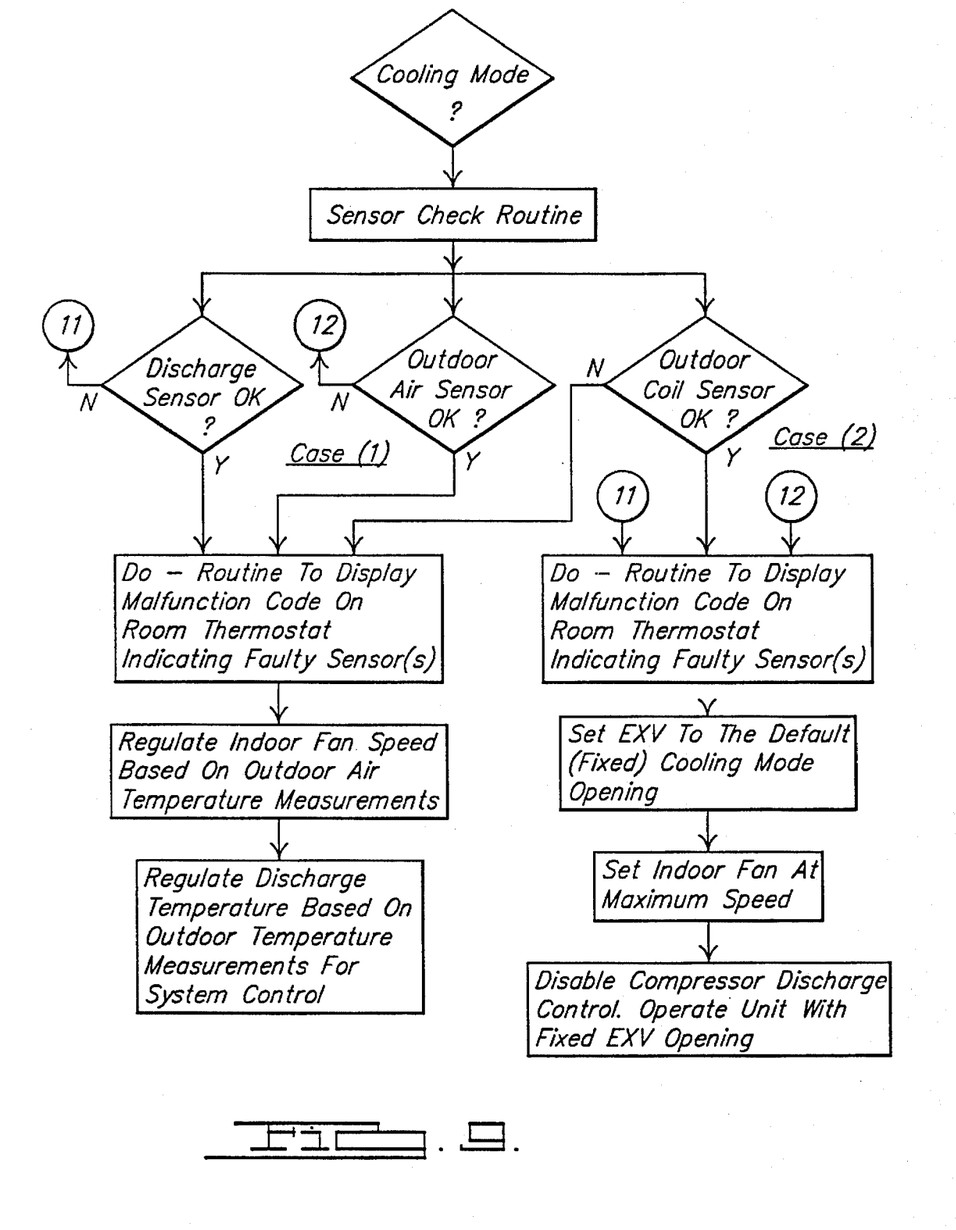
Figure 10:
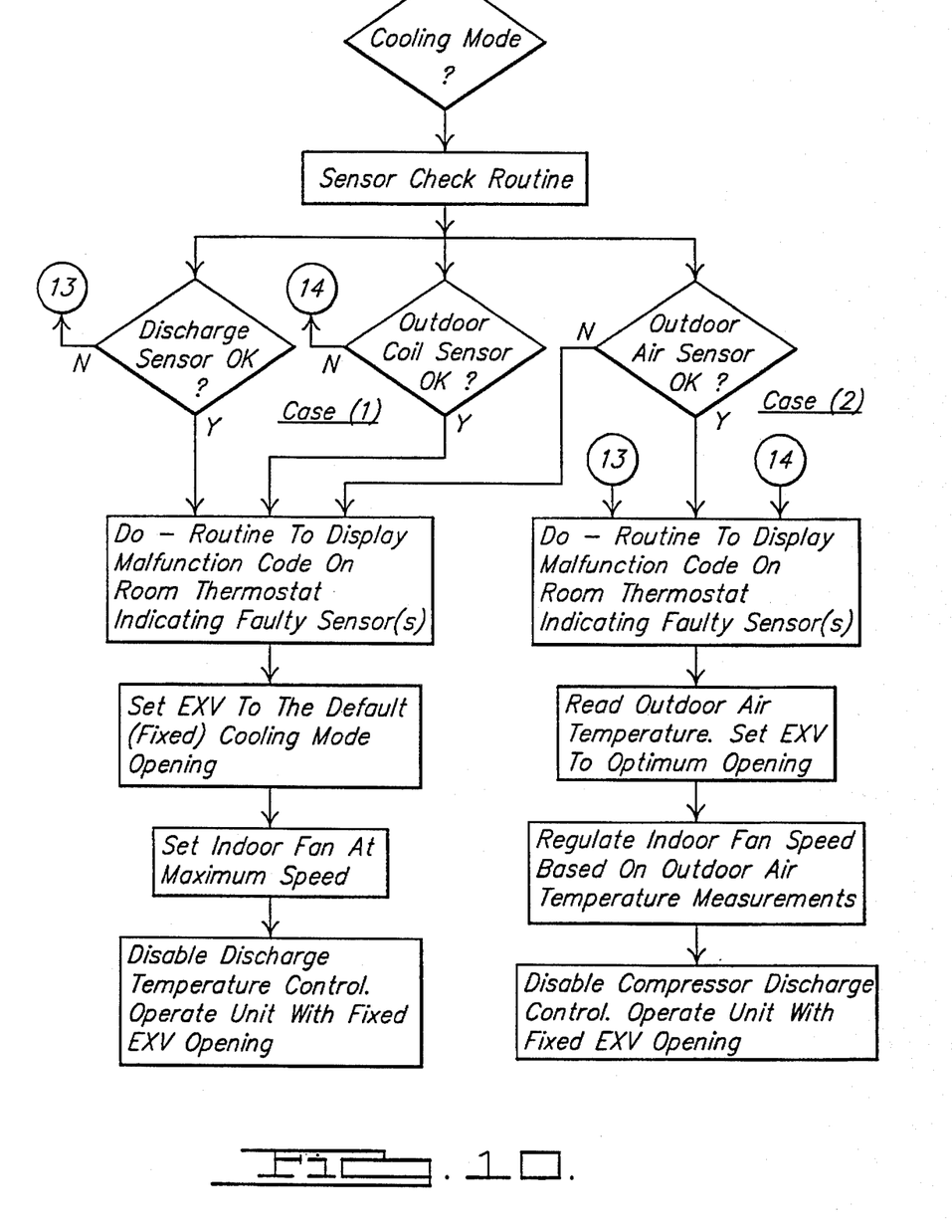
Figure 11:
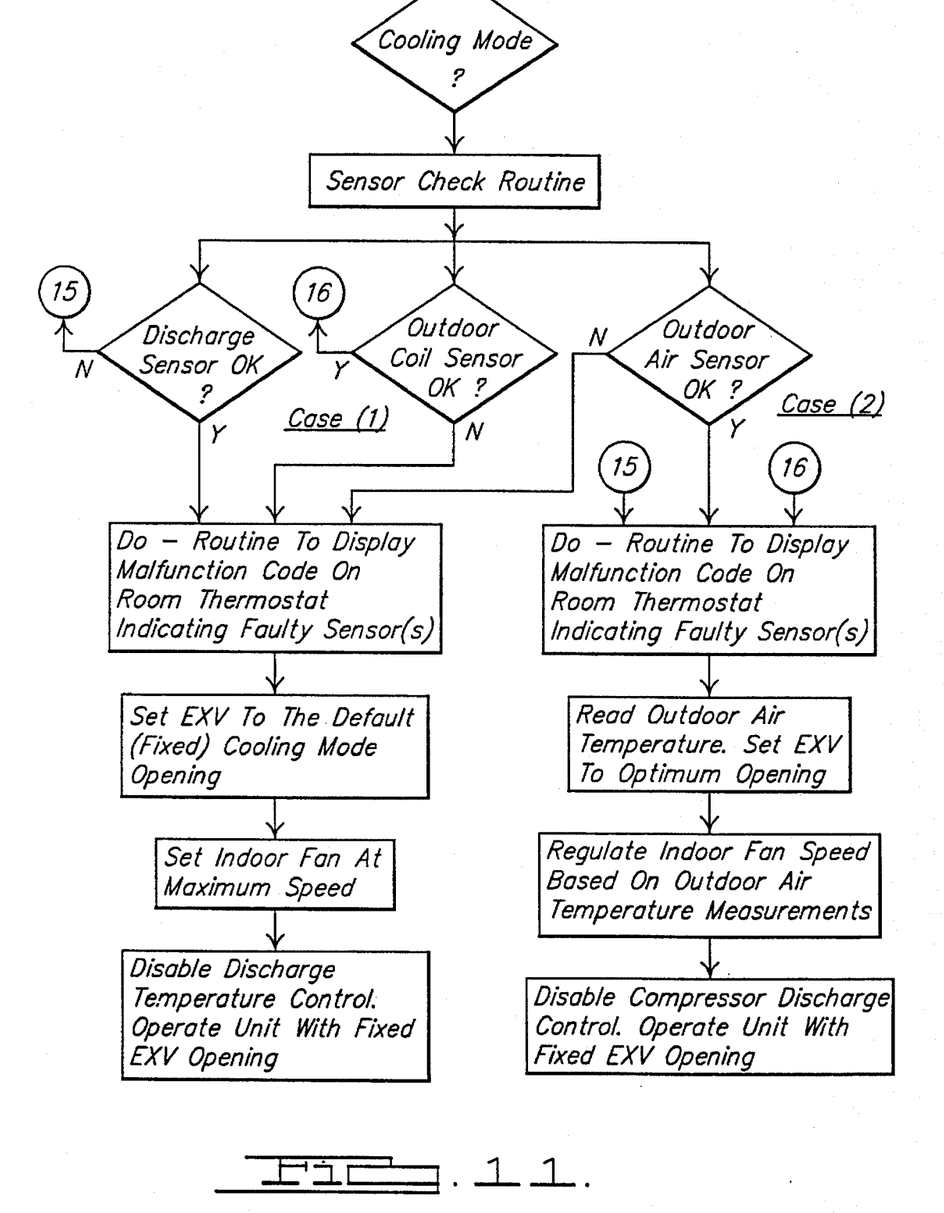

| | FIG. 8 | FIG. 9 | FIG. 10 | FIG. 11 |
|---|---|---|---|---|
| Operation Mode | Cool | Cool | Cool | Cool |
| Discharge Sensor | Not OK[4] OK[3] | Not OK[4] OK[3] | OK[3] Not OK[4] | Not OK[4] OK[3] |
| Outdoor Coil Sensor | Not OK[4] OK[3] | OK[4] Not OK[3] | OK[3] Not OK[4] | OK[4] Not OK[3] |
| Outdoor Air Sensor | Not OK[4] OK[3] | Not OK[4] OK[3] | Not OK[3] OK[4] | OK[4] Not OK[3] |
| EXV Control Method | Default-Fixed EXV Opening[4] Auto-Discharge Temp. Control[3] | Default-Fixed EXV Opening[4] Auto-Discharge Temp. Control[3] | Default-Fixed EXV Opening[3] Fixed EXV Opening-Function of Outdoor Air Temp.[4] | Fixed EXV Opening-Function of Outdoor Air Temp.[4] Default-Fixed EXV Opening[3] |
| Indoor Fan Speed Setting | Maximum[4] Based on Outdoor Temp.[3] | Maximum[4] Based on Outdoor Temp.[3] | Maximum[3] Based on Outdoor Temp.[4] | Based on Outdoor Temp.[4] Maximum[3] |

The sensor fault handling mechanism and method illustrated above is designed to automatically select the operating mode of key system components so that sensor malfunction will have a minimum negative impact on system performance and reliability. While the invention has been illustrated in its presently preferred form, it will be understood that the invention is capable of modification or change without departing from the spirit of the invention as set forth in the appended claims.

We claim:

1. In a heat pump system including a refrigerant compressor and an electrically controlled expansion valve, a system operating method comprising, obtaining a discharge temperature by measuring a property indicative of the temperature of refrigerant discharged from the compressor;

comparing the discharge temperature with a predetermined temperature indicative of an alert condition;

based on said comparing step:
  (a) if the discharge temperature is above said predetermined temperature, using the discharge temperature to control the setting of said expansion valve, and
  (b) if the discharge temperature is not above said predetermined temperature, setting said expansion valve to a predetermined setting.

2. The method of claim 1 wherein said alert condition represents a sensor fault condition.

3. The method of claim 1 wherein said alert condition represents a maximum load condition.

4. The method of claim 1 wherein said alert condition represents a low voltage condition.

5. The method of claim 3 or 4 wherein if the discharge temperature is above said predetermined temperature, said expansion valve is electrically controlled to increase refrigerant flow.

6. In a heat pump system including a refrigerant compressor and an electrically controlled expansion valve, a system operating method comprising, obtaining a discharge temperature by measuring a property indicative of the temperature of refrigerant discharged from the compressor;

obtaining an outdoor air temperature by measuring a property indicative of the outdoor air temperature;

comparing the discharge temperature with a predetermined temperature indicative of an alert condition;

comparing the outdoor air temperature with a second predetermined temperature indicative of a second alert condition; and based on said comparing steps:
  (a) if said outdoor air temperature is above said second predetermined temperature and if said discharge temperature is above said predetermined temperature, then controlling said expansion valve to increase refrigerant flow, and
  (b) if said discharge temperature is not above said predetermined temperature,
  setting said expansion valve to a predetermined setting.

7. The method of claim 6 wherein said alert condition represents a sensor fault condition.

8. The method of claim 6 wherein said alert condition represents a maximum load condition.

9. The method of claim 6 wherein said alert condition represents a low voltage condition.

10. The method of claim 8 or 9 wherein if the discharge temperature is above said predetermined temperature, said expansion valve is electrically controlled to increase refrigerant flow.

11. In a heat pump system including a refrigerant compressor and an electrically controlled expansion valve, a system operating method comprising, obtaining a discharge temperature by measuring a property indicative of the temperature of refrigerant discharged from the compressor;

obtaining a line voltage measurement by measuring a property indicative of line voltage;

comparing the discharge temperature with a predetermined temperature indicative of an alert condition;

comparing the line voltage to a predetermined nominal voltage; and based on said comparing steps:
  (a) if said discharge temperature is above the said predetermined temperature and if said line voltage measurement is below said predetermined nominal voltage,
  then controlling said expansion valve to increase refrigerant flow, and
  (b) if said discharge temperature is not above said predetermined temperature,
  setting said expansion valve to a predetermined setting.

12. The method of claim 11 wherein said alert condition represents a sensor fault condition.

13. The method of claim 11 wherein said alert condition represents a maximum load condition.

14. The method of claim 11 wherein said alert condition represents a low voltage condition.

15. The method of claim 13 or 14 wherein if the discharge temperature is above said predetermined temperature, said expansion valve is electrically controlled to increase refrigerant flow.

* * * * *

UNITED STATES PATENT AND TRADEMARK OFFICE
CERTIFICATE OF CORRECTION

PATENT NO. : 5,630,325
DATED : May 20, 1997
INVENTOR(S) : Vijay Bahel; Hank Millet; Mickey Hickey; Hung Pham; Gregory P. Herroon; Wayne R. Warner; Jean-Luc M. Caillat It is certified that error appears in the above-indentified patent and that said Letters Patent is hereby corrected as shown below:

On the Title Page, under Related U.S. Application Data, "Jan. 24, 1995" should be -- Jan. 24, 1994 --.

Column 1, line 5, "Jan. 24, 1995" should be -- Jan. 24, 1994 --.

Column 3, line 54, (second occurrence) delete ",".

Column 4, line 16, after "indoor" insert -- air --.

Column 8, line 58, insert footnote -- 3 & 4  See Figures 8 through 11 for Explanation --.

Signed and Sealed this

Twenty-eighth Day of October, 1997

Attest:

BRUCE LEHMAN

*Attesting Officer*            *Commissioner of Patents and Trademarks*